US008185599B2

(12) United States Patent
Kansal et al.

(10) Patent No.: US 8,185,599 B2
(45) Date of Patent: May 22, 2012

(54) PROGRAMMING TECHNIQUES FOR DISTRIBUTED MULTI-PARTY NETWORKS

(75) Inventors: Aman Kansal, Issaquah, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 11/787,939

(22) Filed: Apr. 18, 2007

(65) Prior Publication Data

US 2008/0263196 A1 Oct. 23, 2008

(51) Int. Cl.
*G06F 15/16* (2006.01)
(52) U.S. Cl. ........................................ 709/211; 709/229
(58) Field of Classification Search .................. 709/208, 709/211, 229
See application file for complete search history.

(56) References Cited

U.S. PATENT DOCUMENTS

| | | | |
|---|---|---|---|
| 6,167,033 A | 12/2000 | Chang et al. | |
| 6,349,337 B1 | 2/2002 | Parsons, Jr. et al. | |
| 7,162,509 B2 | 1/2007 | Brown et al. | |
| 7,236,271 B2 * | 6/2007 | Silverbrook | 358/473 |
| 7,284,921 B2 * | 10/2007 | Lapstun et al. | 400/88 |
| 2003/0028685 A1 | 2/2003 | Smith et al. | |
| 2003/0229900 A1 | 12/2003 | Reisman | |
| 2004/0003042 A1 | 1/2004 | Horvitz et al. | |
| 2006/0005205 A1 | 1/2006 | Illowsky et al. | |
| 2006/0200794 A1 | 9/2006 | Robertson et al. | |
| 2006/0294290 A1 | 12/2006 | Raker et al. | |
| 2007/0037605 A1 * | 2/2007 | Logan | 455/567 |
| 2007/0143452 A1 * | 6/2007 | Suenbuel et al. | 709/220 |
| 2007/0209075 A1 * | 9/2007 | Coffman | 726/23 |
| 2007/0214374 A1 * | 9/2007 | Hempstead et al. | 713/300 |
| 2008/0005729 A1 * | 1/2008 | Harvey et al. | 717/155 |
| 2008/0172303 A1 * | 7/2008 | Skaaksrud et al. | 705/26 |

FOREIGN PATENT DOCUMENTS

EP 1239368 A2 9/2002

OTHER PUBLICATIONS

International Search Report, mailed May 25, 2009, 11 pages.
Mullen, et al., "Customer-Driven Sensor Management", IEEE Intelligent Systems, Mar. 2006, pp. 41-49, vol. 21, Issue 2, IEEE Educational Activities Department Piscataway, NJ, USA.

(Continued)

*Primary Examiner* — Patrice Winder
*Assistant Examiner* — Ebrahim Golabbakhsh

(57) ABSTRACT

Architecture for programming in a distributed computing environment where different components of a system are owned or controlled by different entities and heterogeneous in terms of resource availability and a willingness to share. Multiple devices can be programmed when a task requires human intervention. Method are described for using a tolerance level provided by the application developer to control the execution of the application instructions at multiple devices with varying resources, and for using an involvement level provided by the sensor or computing device owner for the purpose of automatically adapting the execution of application code at multiple devices to suit the individual owner's willingness to share resources, and the capabilities of resources available with that owner. Code distribution allows an application developed by one entity to be distributed to multiple devices owned by multiple entities, where each of the entities has varying connectivity, resource availability, and sharing willingness.

19 Claims, 11 Drawing Sheets

OTHER PUBLICATIONS

Phan, et al., "Challenge: Integrating Mobile Wireless Devices Into the Computational Grid", International Conference on Mobile Computing and Networking, Proceedings of the 8th annual international conference on Mobile computing and networking, Atlanta, Georgia, USA, Session: Challenges, Sep. 23-26, 2002, pp. 271-278, ACM New York, NY, USA.

Chu, et al., "Mobile OGSI.NET: Grid Computing on Mobile Devices", Proceedings of the 5th IEEE/ACM International Workshop on Grid Computing, Nov. 8, 2004, 10 pages.

Korpela, et al., "SETI@home—Massively Distributed Computing for SETI", Date: 2001, pp. 78-83, vol. 3, Issue 1, http://ieeexplore.ieee.org/iel5/5992/19365/00895191.pdf?tp=&isnumber=&arnumber=895191, Jan. 2001.

Marzullo, et al., "Tools for Distributed Application Management", Date: Jun. 1990, http://ntrs.nasa.gov/archive/nasa/casi.ntrs.nasa.gov/19900016270_1990016270.pdf.

Ratti,et al.,"Mobile Landscapes:Graz in Real Times", Oct. 2005.

Eisenman,et al Metrosense Project : People-centric sensing at scale, Oct. 2006.

Hull ,et al.,"Car Tel :A Distributed Mobile Sensor Computing System",http;//cartel.csail.mit.edu, Nov. 2006.

Bruke ,et al.,"Participatory Sensing", Oct. 2006.

\* cited by examiner

PROGRAMMING TECHNIQUES FOR DISTRIBUTED MULTI-PARTY NETWORKS

BACKGROUND

Many people carry mobile devices equipped with audio and/or visual sensors such as cameras and microphones. Further, many homes and businesses have other sensors installed, such as weather stations, security cameras, parking counters, motion sensors, security systems, pollution sensors, etc. Currently, these are operated as standalone systems, serving the owner or operator of that system (e.g., a cell-phone user may take a picture and send it to a friend), or the clients of the owner/operator (e.g., shoppers at a mall may be benefited by the mall's parking sensors). In some cases, limited sharing of data is available, such as uploading of collected weather station data or images to Internet-based sharing sites.

A significant number of potential applications can be designed if the swarm of the available sensors deployed or carried by multiple owners or operators is used as a shared system, and applications can be written to access data from such sensors. However, there is a problem in developing applications that can access, control, and program the behavior of these multiple sensors since the devices and/or systems that contain the sensors are operated or controlled by disparate entities. The entities may have distinct uses for the sensors, a varying willingness to share owned resources, different privacy sensitivities with regard to sharing sensor data, and different resource availabilities in terms of network connectivity, battery energy, and storage capacity. Additionally, the computational resources and sensing capabilities of the disparate systems may be different. Stiff further, for the sensing devices carried by humans such as cell phones, programming the devices to carry out a sensing task such as taking a picture of a desired object may require human intervention, and programming this from a remote application is a challenge. Similar problems may arise in any system that attempts to program a distributed system that comprises computing elements owned and operated by multiple different entities that use systems for specific purposes.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides programming techniques that address programming in a distributed sensing environment where different components of the system are owned or controlled by different entities, and are heterogeneous in terms of resource availability and a willingness to share. Programming of multiple devices when the required task at the device requires human intervention is also provided.

The architecture includes a method of using a tolerance level provided by an application developer to control the execution of the application instructions at multiple devices with varying resource capability and availability. Additionally, a method is provided for using involvement level data provided by the sensor or computing device owner for the purpose of automatically adapting the execution of application code at multiple devices to suit the individual owner's willingness to share resources, and the capabilities of resources available with that owner.

An application code distribution technique is described that allows an application developed by one entity to be distributed to multiple devices owned by disparate entities, where each of the entities has varying connectivity, resource availability, and willingness to share.

A declarative command interface is provided for issuing programmer commands to sensor devices and/or systems which ensures the protection of the device but at the same time allows the device to respond to programmer needs to an acceptable extent.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
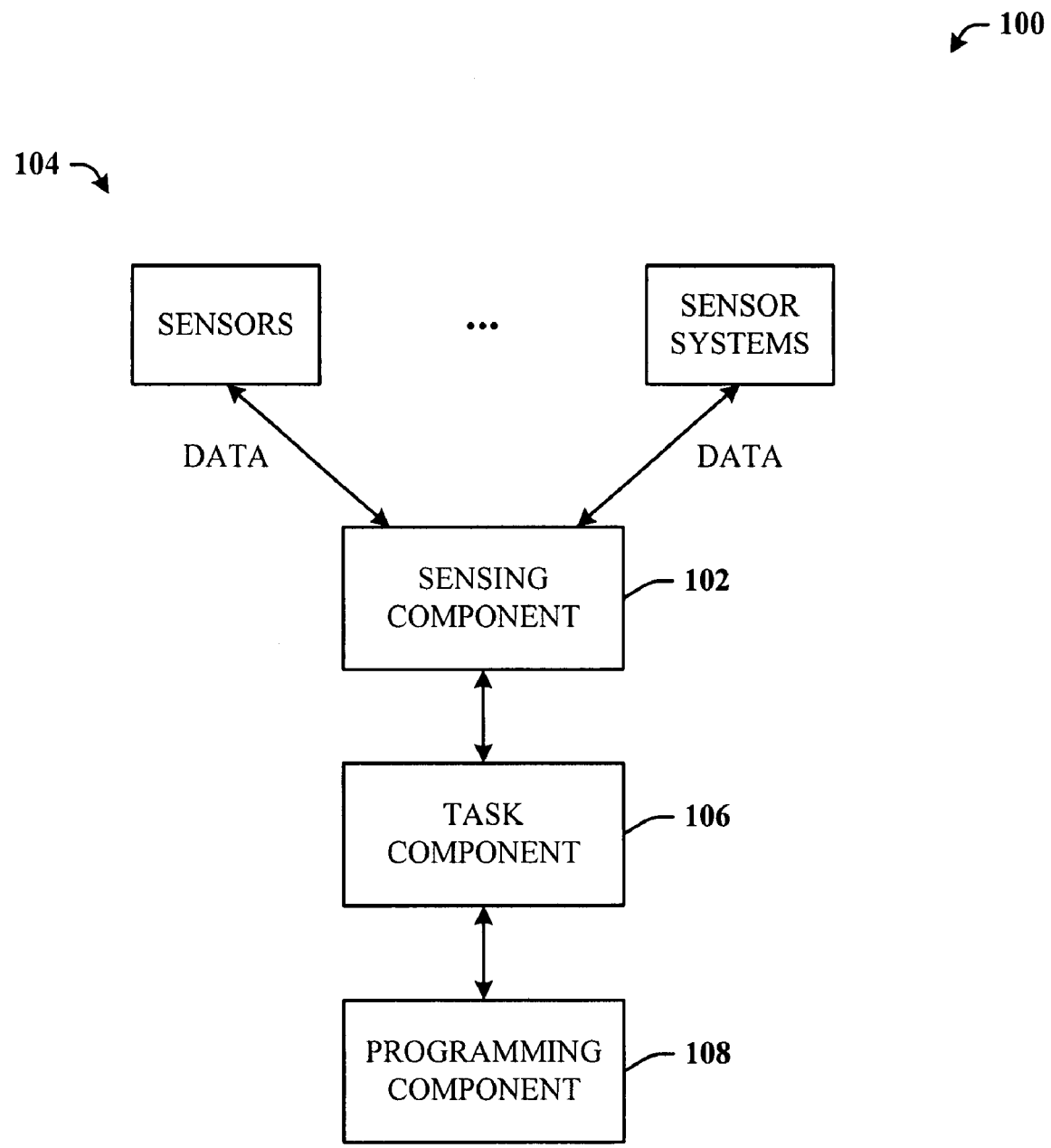
FIG. 1 illustrates a computer-implemented system for accessing data from disparate sensors and/or sensor systems based on willingness of the owners (or party) thereof to share the sensor and/or sensor system data.

The disclosed architecture leverages a vast resource of in-situ devices and systems to obtain data. People from all over the world carry cell phones, portable computers, and music players, for example, during work or at different times for different purposes, any or all of which can be potential sources of data. For example, all mobile phones have a microphone, and most have a camera. Other sensors can be connected to a cell phone using Bluetooth technology.

First, mobile phones are connected to a network, and have a relatively predictable power supply based on human user initiated charging. Using such mobile devices as sensors presents a significant advantage over unattended wireless sensor networks in that deploying the sensing hardware and providing it with network and power is already taken care of. Second, mobile phones can provide coverage where static sensors are hard to deploy and maintain. No single entity may have the access rights to place sensors across the complete coverage domain required by an application, such as a combination of subway stations, public parks, and shopping malls. Third, each mobile device is associated with a human user, whose assistance can oftentimes be used to enhance application functionality. For instance, a human user can help by pointing the camera appropriately at the target object to be sensed.

The disclosed architecture enhances the utility of the existing swarm of mobile devices and/or in-situ sensing systems by presenting the devices/systems as a physical sensing substrate that sensor networking applications can program for different sensing objectives. Applications can be developed and enabled using the sensor network of mobile phones, for example, such as instant news coverage for an unplanned interesting event, residential area noise mapping, urban mood inference, trail condition updates after storms, dynamically updated street side imagery overlays for maps, and other enterprise applications that use the audio-visual feeds to compute metrics of interest for various business dashboards. For example, an infrastructure monitoring application can use the swarm of cell phone cameras, owned by distinct persons, present around a city to take pictures of the current ice hazards in different locations. Similarly, applications that use computing resources other than sensing devices may also be developed to exploit multiple systems owned and operated by distinct entities.

The phrase multi-party network is intended to mean a network of devices and/or systems that use at least sensing and computational resources at multiple devices owned by different people or entities. The architecture solves issues related to the variability in resource availability related at least to network connectivity, computational power, and storage capacity, for example, of a device and/or system. The variability can arise from the inherent capabilities of the device or due to the extent of the workload on the device/system resulting from the device owner's existing applications which the device must execute before handling any multi-party applications. For instance, a cell phone can have a very low-rate data connection compared to an enterprise network connecting a computer. Variability can also include a device owner's willingness to share data, bear the expense of resource usage, and/or provide human intervention for the multi-party applications. For instance, one cell phone owner may not be willing to take more than one picture a day while another owner may be willing to take and share dozens of pictures.

The disclosed architecture is sensitive to the fact that each sensor device/system may need to continue running existing applications and processes unhindered when subscribing to the multi-party network. This includes controlling how a consumer who is programming the multi-party network is able to change the behavior of the sensor device. For instance, the device owner may wish to continue using a cell phone to make and receive calls without being interrupted when a multi-party network application is using the cell phone for sensing purposes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for accessing data from disparate sensors and/or sensor systems 104 based on willingness of the owners (or party) thereof to share the sensor and/or sensor system data. The system 100 includes a multi-party network of users who based on a requested purpose are willing to use and allow access to sensor data captured by user devices (e.g., cell phones, portable computers, etc.) and/or systems (e.g., business sensing systems, personal data and acquisition systems, etc.).

The system 100 includes a sensing component 102 for accessing the sensors and/or sensor systems 104 of a multi-party network based on willingness of a party to share the sensors. As will be described infra, the willingness can be based on an involvement level that defines, for example, how much interruption in services, device processing, bandwidth, power consumption, etc., and on the willingness of the owner to participate in allowing and providing the sensor data. For example, in some instances, the device user (or owner) can be instructed to obtain or capture data requested by programmed applications or tasks being executed by the applications. Furthermore, the owner can be requested (or enticed with rewards, etc.) to participate or allow access to device sensor data at specific times (e.g., 5 PM each day for rush-hour photos) or for certain events (e.g., weather reports or images as a storm moves through the user area). In other examples, the owner subscribes to a service that loads an agent or application on the owner's device (e.g., cell phone) for manually or automatically capturing sensor data via the user device at specified times (based on the availability of the device and willingness of the device or system owner to participate).

The system 100 can also include a task component 106 for selecting the sensors and/or sensor systems 104 to access in accordance with execution of one or more pre-programmed tasks by consumers of the data. In accordance therewith, the system 100 can also include a programming component 108 for creating programs that include one or more program parameters that define the task. In other words, a data consumer (e.g., user, system, and programmer) can manipulate and cause tasks to be executed against the network of sensors for obtaining the desired sensor data. The programming component 108 can be a web-based programming module that allows access by data consumers to interact and create the tasks for execution. Alternatively, or in combination therewith, consumers (or programmers) can upload tasks via consumer programs which will be execute by the programming component 108.

Given the far-reaching nature of networks, the disclosed architecture can include sensors of owner devices and systems from all over the world. The ubiquitous nature of cellular networks and cell phones provides a significant and valuable resource for obtaining a wide variety of data. Global and national events, surveys, political, commercial and demographic data can be obtained quickly and easily using the disclosed architecture. Vast sources of data can be readily obtained, processed, and consumed for any purpose based on the willingness of device users to participate.

Figure 2:
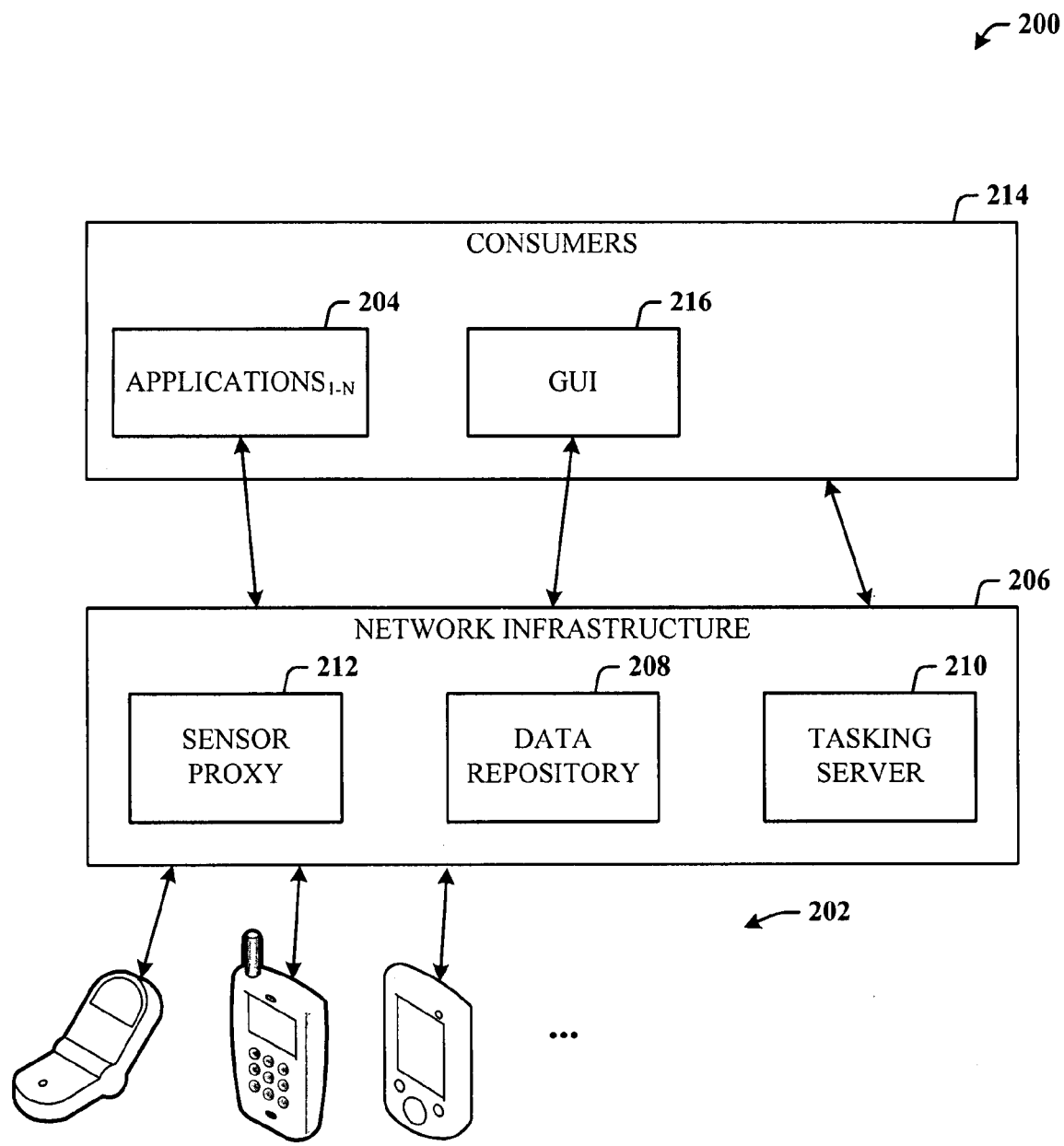
FIG. 2 illustrates an exemplary system that provides programming techniques for a distributed multi-party network of mobile phones having sensors and sensor systems.

FIG. 2 illustrates an exemplary system 200 that provides programming techniques for a distributed multi-party network of mobile phones 202 (also referred to as mobile sensors or sensors) having sensors and sensor systems. The sensor network of mobile phones 202 is established for use as a shared system, in contrast to a conventional system where a single application controls and uses a dedicated set of mobile devices carried by users or vehicles directly involved with that application. The disclosed shared system 200 provides expansive coverage that a single dedicated system may never be able to match and the re-use of physical resources by multiple applications 204 (denoted APPLICATIONS$_{1-N}$, where N is a positive integer).

In the shared context, the phones 202 are carried and used by the phone owners. The network of phones 202 interfaces to a network infrastructure 206. The network infrastructure 206 in this exemplary embodiment consists of three main components. The first is a data repository 208 for storing the sensor data provided by the sensing devices 202. A salient feature of a mobile phone sensor network is that each sensor node is mobile and a motion pattern cannot be easily tacked and controlled. Most applications are unlikely to be interested in the data collected by a specific device, but rather prefer data from a specific region and time window. The device identities of the devices 202 that contributed that data may only be of secondary importance. Thus, it is can be desirable to index the uploaded data by location and time, and archive the data so that consumer applications that need the data can be served from the archive without having to discover the specific devices that were present in the required region during the time window of interest. The data repository 208 has precisely this responsibility.

In order to index data by location, the phone location can be used. Phone location information can be obtained using several methods including cell tower triangulation carried out by the cell phone network, such as by using signal strength measurements from one or more cellular base stations. Non-triangulation technologies such as location services (LCS) can also be employed to add a location-based dimension for processing. Geolocation services such as global positioning system (GPS) can also be employed. Mobile phones can be produced with built-in GPS receivers. Other methods for obtaining location data for the mobile devices 202 includes Wi-Fi-based location data for mobile devices, or using human entered keywords attached to data samples, such as a landmark name entered for an images sample.

A second component of the network infrastructure 206 is a tasking server 210 that enables the applications 204 to control or program the sensor network of devices 202 per application requirements. Programming tasks can involve sampling, data processing, and event-based responses to commands while ensuring that the mobile device and/or systems remain secure and continue to serve the local owner without loss of performance. The tasking server 210 is responsible for selecting which of the many sensors 202 in the shared system are relevant for executing given tasks. The operation of the tasking server 210, including the sensor selection processes, is discussed in more detail later.

A third main component in the network infrastructure 206 is a sensor proxy 212 that allows disconnected operation of the mobile sensors 202. A responsibility of the proxy 212 is to act as a network-connected representative for devices 202 that are not constantly connected to the network infrastructure 206. For instance, the proxy 212 can store commands for the devices 202 that are not connected at the time the commands become available until the time that the device actually connects to the infrastructure 206. The proxy 212 can be extended to include functions of tracking or predicting the motion or availability of mobile devices 202 such that the remaining components in the system are relieved of that burden.

Data consumers (or programmers) 214 include human consumers and/or applications that access the shared sensor network 202 and/or sensor data in the repository 208. The consumers 214, in this particular implementation, include the applications 204 and a graphical user interface (GUI) 216 for operating through the tasking server 210. The human users can access the network of devices 202 and/or sensor data repository 208 through the GUI 216. Realtime data can be stored in the repository 208 and/or passed directly to the consumers 214 and/or applications 204. Examples of consumers 214 include casual home users who wish to see what is going on at a remote location, travelers, hobbyists who wish to track the condition of the infrastructure used for pursuing their hobby such as hiking trails, business managers who wish to use live sensor data from multiple locations for business dashboards, government agencies, disaster response personnel, news agencies, community activists who wish to use real world data such as pollution or noise levels for promoting social welfare projects, industrial lobbyists, etc. Note that although depicted to include both the applications 204 and the GUI 216, the consumers 214 can be a block separate therefrom.

Figure 3:
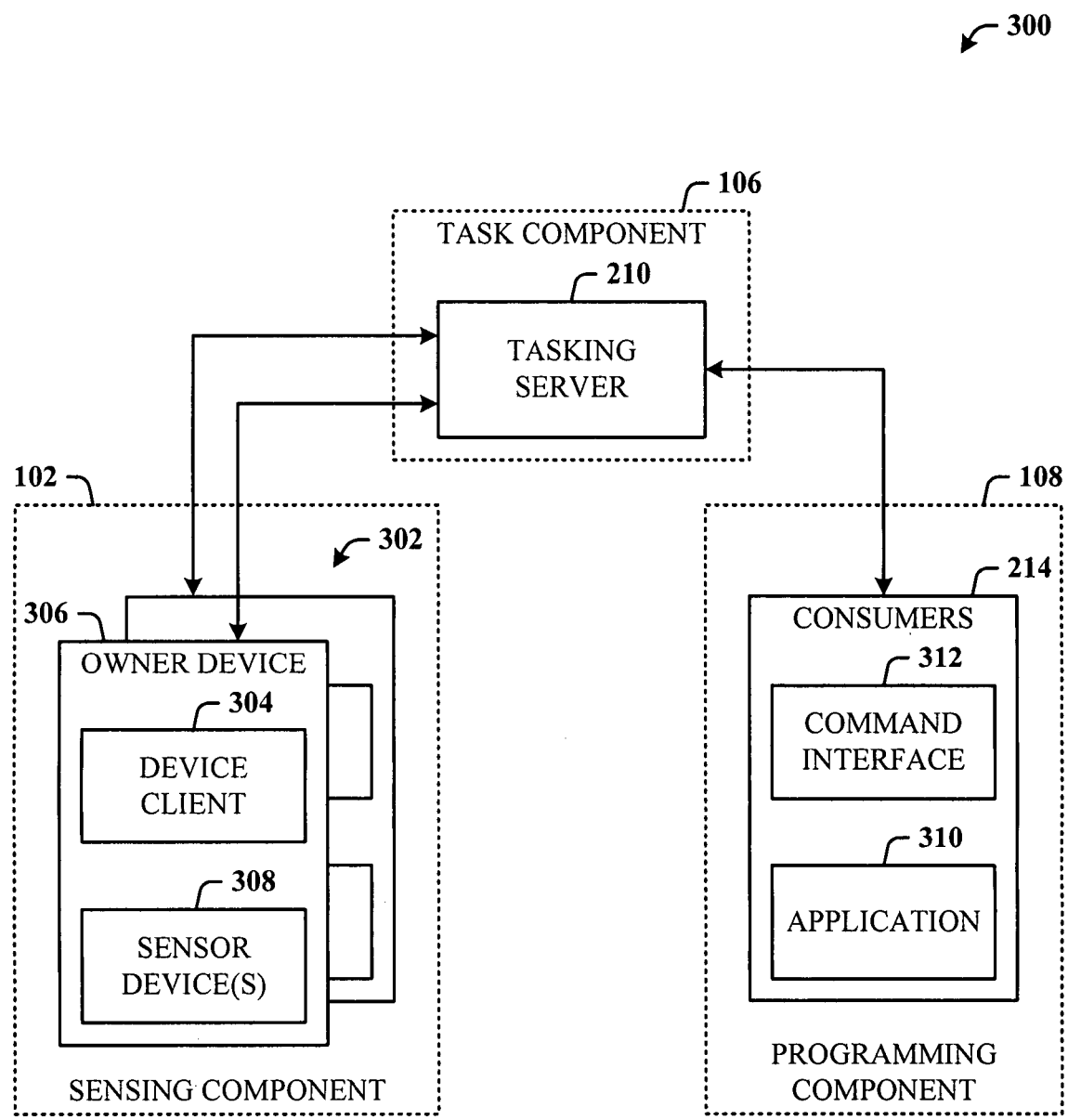
FIG. 3 illustrates an alternative representation of a system for programming against a distributed multi-party network of sensors and sensor systems.

FIG. 3 illustrates an alternative representation of a system 300 for programming a distributed multi-party network (e.g., the mobile sensors 202 of FIG. 2) of sensors and sensor systems. The sensing component 102 of FIG. 1 can include owner systems 302 that represent many different sensing devices or systems such as a cell phone, a home weather station, a business camera surveillance system, and so on. These devices and systems 302, due to owner's usage, control and/or policies, can have constant or sporadic connectivity to the associated communication networks.

A device client 304 of a first owner device/system 306 can be provided as a software component on the owner system 302 for execution using the system 306 processor, memory and network connection and for obtaining and transmitting sensor data via one or more sensor devices 308. The sensor device(s) 308 exist conventionally and together constitute the multi-party network. The tasking server 210, as part of the tasking component 106 of FIG. 1, represents a central server as part of the network infrastructure 206 of FIG. 2. The tasking server 210 manages functions required for programming against the sensor data, sensor systems, and devices.

The consumers 214, now illustrated as part of the programming component of FIG. 1, include one or more programmers that program the multi-party network for the certain purposes such as sensing. Consumers can also include users that desire the sensor data. Many such consumers can exist to obtain data simultaneously. The terms consumers and programmer are used interchangeably herein. Each of the consumers 214 has an application 310 that accesses the multi-party network for collecting data or other resources. The application 310 interacts with the multi-party network using a software component referred to as a command interface 312. The application 310 can be any compatible application that interfaces to the tasking server 210.

Commands from the command interface 312 are uploaded to the tasking server 210. The tasking server 210 is responsible for determining which commands are relevant for execution by which of the participating devices. This requires the server to perform multiple roles. One of these roles is authentication of the programmer. The tasking server 210 can use one or more policies for allowing access by consumers 214, based on the intended use of the multi-party system. For instance, only trusted consumers (or programmers) will be allowed to access and use command parameters. Further, certain command types may require a fee to be paid and the tasking server 210 can ensure that appropriate fees are paid as per regulations.

Another role is to parse the command to decide which of the sensor devices in the multi-party network should be given the submitted command. The command includes multiple command parameters, as described later. The tasking server 210 checks WHEN and WHERE parameters, for example, of the command to determine which sensor devices are likely to be able to meet the when (time window of interest) and where (spatial region of interest) conditions of the command.

A third role of the tasking server 210 is to match the involvement level of the relevant devices with the required tolerance levels of the command. The tolerance levels and involvement levels are described in detail later, including how the levels are used in sensor selection. A fourth role of the server 210 is to check whether the instructions in a WHAT parameter of the command are supported at the devices shortlisted based on above selection steps, and then determines a list of devices to which this command may be given to.

Yet another role of the tasking server 210 can be to make the commands available to the sensor devices and the results of the commands available to the consumers (programmers) or consumer applications. At least two methods are provided for distributing the commands. A first method facilitates distribution of those commands that need to be distributed immediately to the one or more devices. This method initiates a connection to the device by the tasking server 210. The command is then immediately sent to the device using this connection. The first method can be made available only for certain devices which are able to accept connections from the server 210.

A second method is used for devices/systems which are unable or do not wish to be contacted by the server 210. Examples of such devices/systems include home-based sensor devices (e.g., security systems) protected by a firewall (e.g., home computing systems) that do not allow these devices to be connected, cell phones for which the cost of receiving a connection request can be unacceptable to the owner, or mobile devices which are only within network coverage sporadically. In this second method, the server 210 stores the commands. The devices/systems can asynchronously contact and query the server 210 for commands relevant to the devices/systems. The server 210 then selects the commands relevant to these devices/systems and sends the relevant commands in a reply.

In each of these methods, the tasking server 210 can also include additional steps to authenticate the sensor devices/systems, and/or assign reliability or quality metrics to sensor devices based on the responses given by the devices/systems.

The functions of the device client 304 include, but are not limited to receiving the consumer (programmer) commands through the tasking server 210. For devices which can be directly contacted by the server 210, the client 304 accepts connection requests from the server 210. For other devices, the client 304 connects to the server 210 when the device 306 has connectivity and idle bandwidth is available. The client 304 checks if any commands relevant to the device 306 are available, and if so, downloads the commands.

The device client 304 executes commands and then checks for the best performance requested based on the conditions of the WHEN and WHERE commands. Based on the involvement level of the device for this command (e.g., depending on the source group or other characteristics of the command), the client 304 determines the performance with which the command is to be executed. If the command requires human intervention, and the involvement level allows for human intervention, the client 304 initiates a request to the user, using a notification (e.g., a beep) on the device or other alerting mechanism, at appropriate times. The appropriate time for human intervention can be determined in accordance with the involvement level of the user and the previous times at which human intervention was requested.

The client 304 also facilitates the upload of data and results. The client 304 also decides when to send the results of the command back to the tasking server 210 or requested destination. The client 304 makes this decision based on the RETURN command parameter and a local connection management policy. The client 304 can also block results form being sent based on privacy requirements of the owner. Note that the same entity can act as both a sensor device owner in the multi-party network and as a user/programmer of the multi-party network.

In order to protect the sensor device and its existing functionality from being changed arbitrarily by a consumer 214 (or programmer) of the multi-party network, the command interface 312 is a specialized declarative programming interface. The command interface 312 only allows a multi-party network consumer to issue commands (or command parameters) within a limited set of instructions that are provided the system. This limited set of instructions can include an instruction that is deemed safe to be executed by a sensor device. New instructions can be added to the set depending on requirements. Note that a sensor device can further restrict use of one or more of the commands in this set and support only some selected commands.

Figure 4:
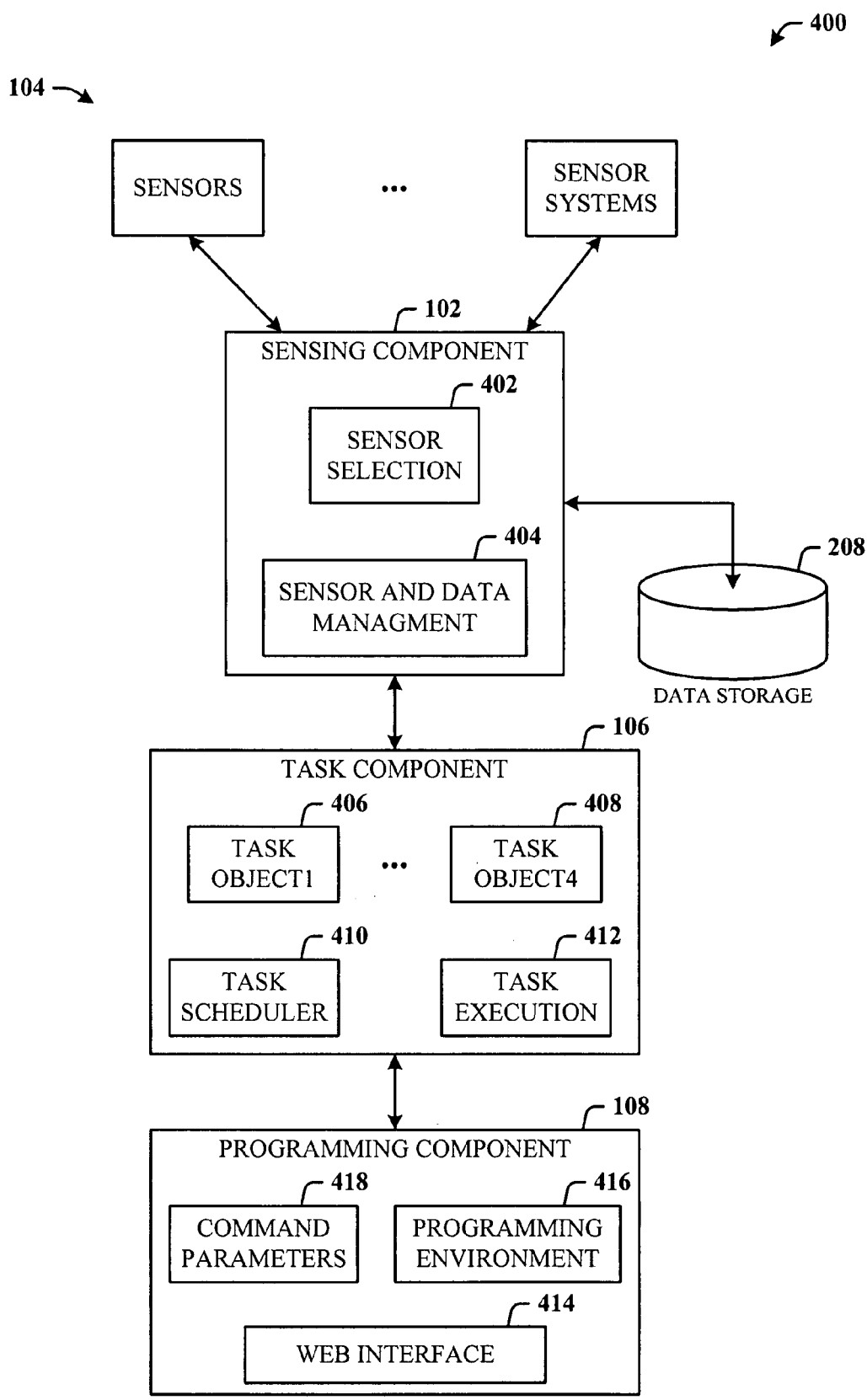
FIG. 4 illustrates a more detailed system for programming against and obtaining from a distributed multi-party network of sensors and sensor systems.

FIG. 4 illustrates a more detailed system 400 for programming and obtaining data from a distributed multi-party network of sensors and sensor systems. The sensing component 102 includes a sensor selection component 402 for selecting a subset of the sensor and/or sensor systems 104. For example, the consumer can choose to obtain data only from sensor and sensor systems in a specific geographic location or from some or all of the systems 104 as a predetermined time. The sensing component 102 can also include a sensor and data management component 404 that interfaces to the sensor selection component 402 for controlling selection of the desired sensors and systems 104 and processing the received sensor data, which can be stored in the data repository 208.

The task component 106, which can be or include the tasking server 210, executes one or more task objects, for example, a first task object 406 (denoted TASK OBJECT1) and a second task object 408 (denoted TASK OBJECT4). The task objects (406 . . . 408) can be created by the consumers for execution against at least the sensors and sensor systems 104 for operation to obtain data. In support thereof, the task component 106 can further include a task scheduler 410 for executing the task objects according to programmed events such as time, day, date, user, device type, and so on. A task execution component 412 facilitates execution of the task objects (406 and 408) based on the scheduler information or settings.

The programming component 108 can further include a web interface 414 via which consumers can access the network infrastructure 206 of FIG. 2, and for entering a programming environment 416. The consumer can develop one or more programs using command parameters 418, the parameters 418 executable as part of the task objects (406 and 408).

Figure 5:
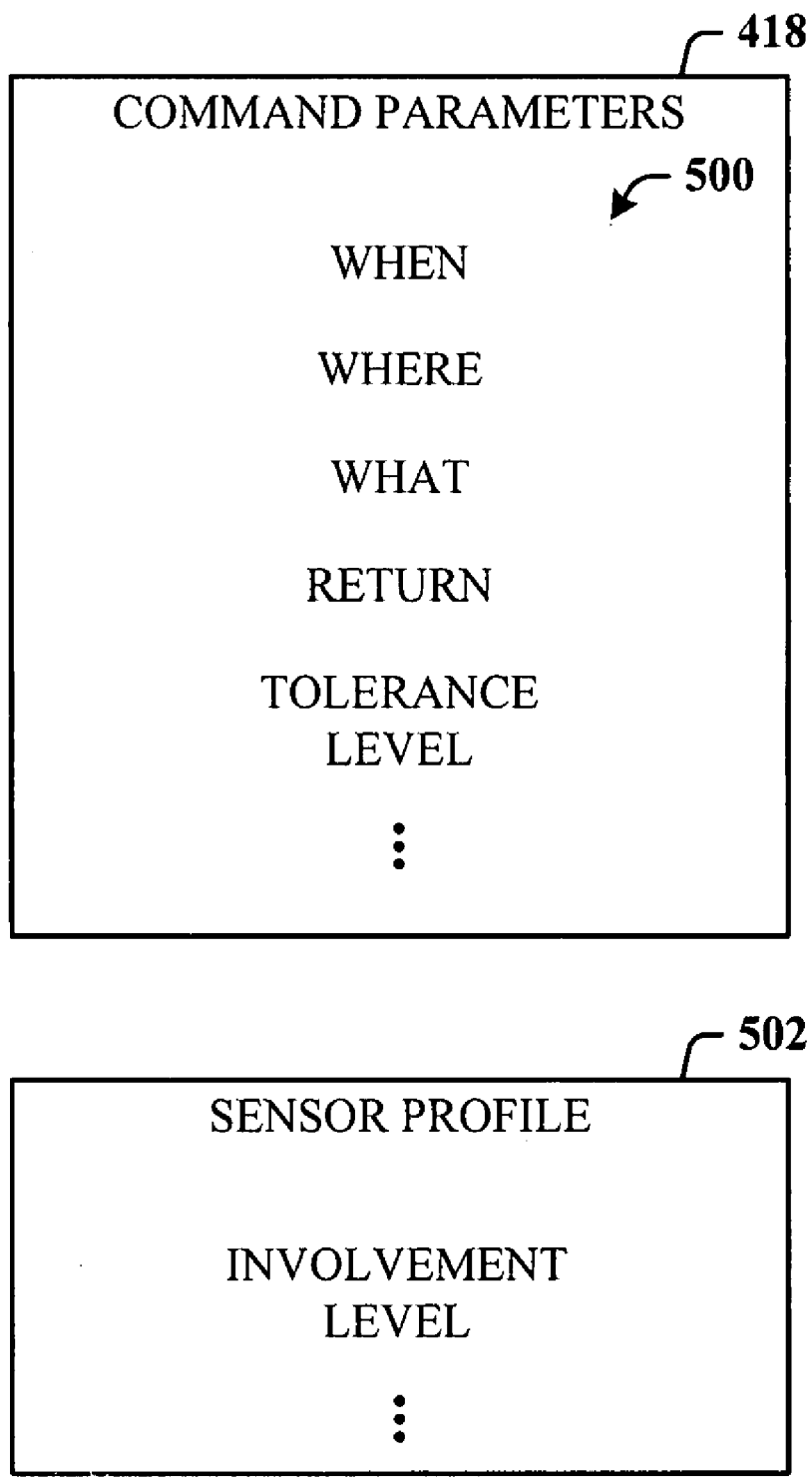
FIG. 5 illustrates one or more of the program parameters that can be employed to obtain sensor data.

FIG. 5 illustrates one or more of the command parameters 418 that can be employed to obtain sensor data. The command parameters 418 include parameters 500 related to when, where, what, return, tolerance level, involvement level, and so on. The command interface allows specifying at least four distinct command parameters. The WHEN and WHERE parameters specify when a command should be executed. The WHEN parameter can be specified as a RATE which indicates that the command should execute periodically at the specified interval, starting at given time, and ending at a given time. The parameter can also be specified as a CONDITION which indicates that the command should be executed whenever the condition is met and how often the condition is checked. The condition can be based on location being equal to a desired location or being within a region, the sensor value crossing a threshold, or the time being equal to a certain value.

A second WHAT parameter specifies what instructions are to be executed. These instructions come from a limited set provided by the interface and include tasks such as taking a sensor reading, requesting the user to take an image, taking and averaging multiple sensor readings, etc.

A third RETURN parameter specifies what results are to be returned and when. If unspecified, the sensor device returns all results obtained in response to executing the command at a time convenient for the device. The RETURN parameter can also provide return address instructions to provide responses directly to the consumer or another entity instead of the tasking server.

A fourth TOLERANCE LEVEL parameter is a set of numbers that quantify the quality of execution expected, as described previously. The tolerance level is one of at least two quantities used for efficient sharing of resources in the multi-party network. The tolerance level is manipulated by the consumer (programmer) as a set of numbers specifying the tolerable values of certain attributes related to a sensor command that the programmer wishes to execute on the multi-party network. The attributes related to a command include, but are not limited to, latency of a response (the maximum time the programmer/application is willing to wait for the first response to the command), rate of response (the minimum number of data samples or other command responses requested per unit time that is desired by the application or programmer), sensing quality (the precision of the sensor data needed), and other parameters specific to each command allowed.

The tolerance level helps the consumer design a command based on the desired performance, but at the same time allowing the command to be executed, with possibly lower performance, at heterogeneous sensor devices of the multi-party network, depending the capabilities and the willingness of the device and/or system owners to share resources. This quantity is designed to help address the variety of device/system capabilities that can be encountered in such a vast array of network components. As an example, a news application that wishes to see the current situation immediately after a serious accident in a city can set the latency tolerance level to five minutes. Accordingly, only sensor devices that can return an image within five minutes may then respond. Another application builds a map of all running hazards (e.g., damaged sidewalks) in Manhattan may set the tolerable latency to one week. All sensor devices that can take one or more pictures of damaged sidewalks within one week may respond to a command with this tolerance level.

FIG. 5 also shows a second set of parameters as part of a sensor profile 502 used to characterize the sensor owner, or one or more of the sensors of a specific owner, the sensor profile. This profile 502 includes at least one quantity called an INVOLVEMENT LEVEL. This quantity can be specified by the sensor device owners or operators. The involvement level quantity comprises a set of numbers that quantify the user's willingness (e.g., based on resource costs or device capability) to provide human intervention or allow user resources to be used by the multi-party network.

The involvement level can be organized by groups, and each sensor device/system owner can subscribe to certain groups associated with a set of intended interests, applications, or objectives. The involvement level quantity (or number) is set for each group to which the device/system owner belongs. For example, a level number "0" can denote no involvement, and any commands issued by the consumers programs in that group are ignored. A tolerance level of number "1" can denote minor involvement and program commands which require little bandwidth and resource usage may be executed.

Other numbers can indicate other degrees of resource usage allowed, or resource usage allowed only when compensated. In one example, higher numbers can represent a greater willingness to respond to program commands. For instance, a cell phone owner belonging to a group of runners in Manhattan can set an involvement level number for that group to a high value that indicates that the owner is willing to let the owner device be used for sensing, frequently, and that the owner is also willing to collect data via human intervention up to certain number of times a day. Thus, when a command requesting images of damaged sidewalks is received from a consumer who is member of the Manhattan runner's group, this device owner can accept the command, as described later.

Each device owner may also belong to a public group which represents all device owners in the multi-party system and a desired involvement level for the public group as well. In addition to interest groups, the device owner can specify involvement levels distinguishable by individual applications or groups of applications, individual programmers/users or groups, by sensor types used, or other resource usage characteristics of the applications. Involvement level may also be based on the compensation offered in return for the data. For instance, a device owner may set a high involvement level for all tasks that offer a monetary reward above a desired threshold.

Figure 6:
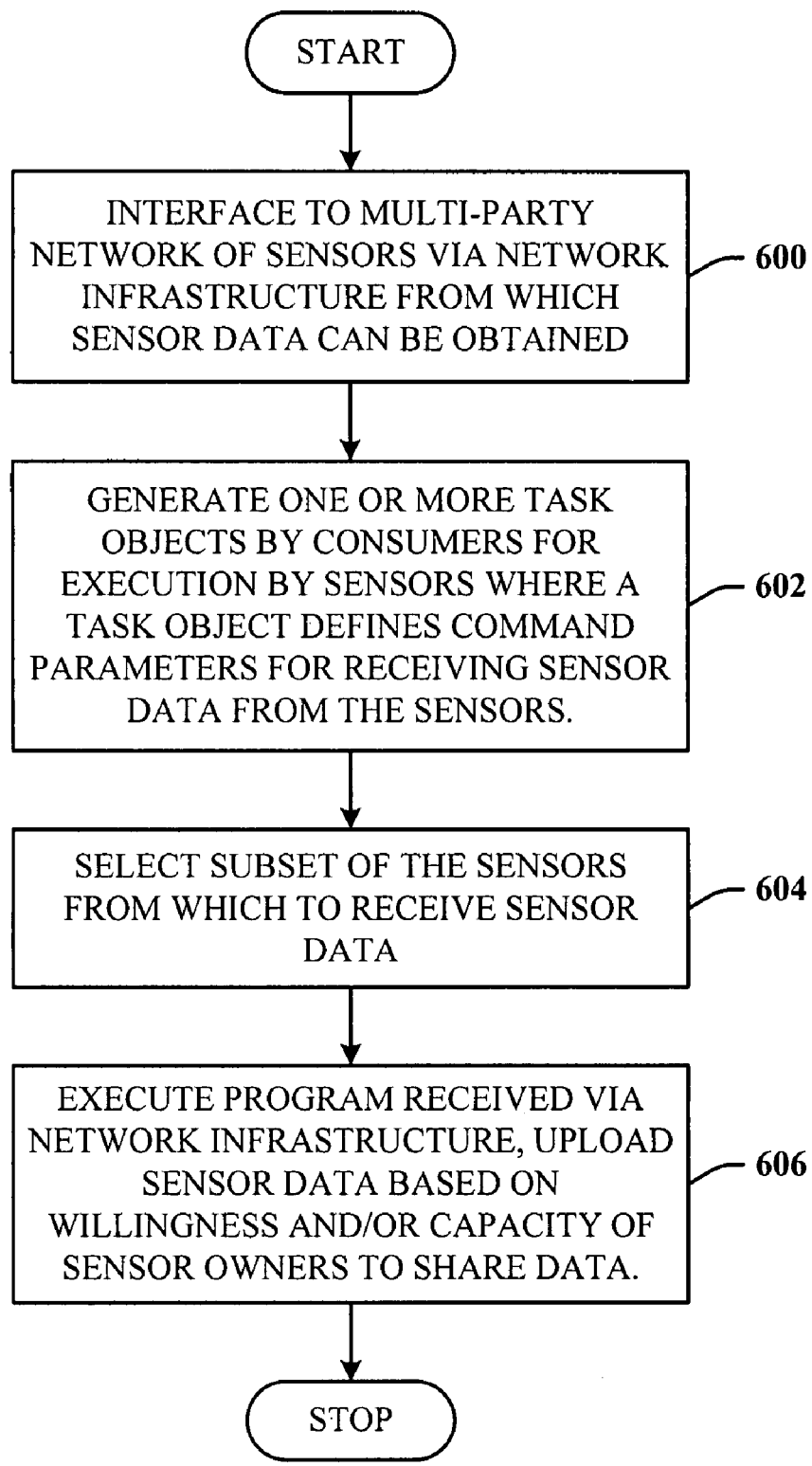
FIG. 6 illustrates a method of obtaining data from a distributed network of devices and systems.

FIG. 6 illustrates a method of obtaining data. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, interface to a multi-party network of cell sensors (e.g., cell phones and/or other sensor systems) via a network infrastructure. The infrastructure allows sensor data of the cell phones and other sensor systems to be obtained. At 602, one or more task objects can be generated by consumers for execution by sensors via the network infrastructure, where the task object defines one or more command parameters for receiving data from the sensors (e.g., cell phones or other sensor systems). At 604, a subset of the network of sensors is selected from which to receive the sensor data. This can be based on the command parameters employed in one or more task objects. At 606, the program is executed via the network infrastructure to receive the sensor data. However, obtainment of the data is based on a willingness and/or capacity of an owner of a sensor (e.g., a cell phone) to allow the data to be obtained.

Figure 7:
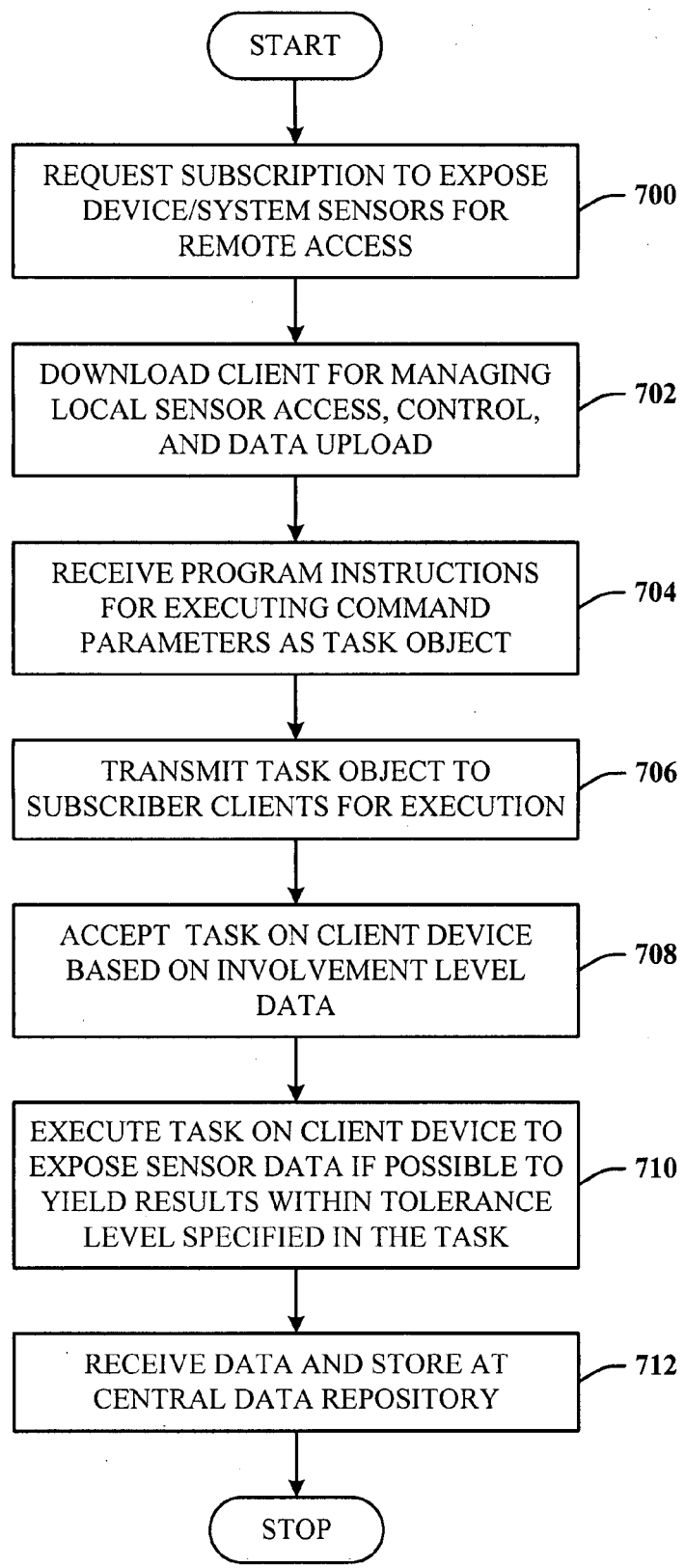
FIG. 7 illustrates a method of exposing data of a remote device sensor and/or remote system sensor.

FIG. 7 illustrates a method of exposing data of a remote device sensor and/or remote system sensor. At 700, subscription is requested from owners of devices and/or systems that can be accessed via one or more networks (e.g., IP network, cellular network, personal networks, and private networks). At 702, for those owners that subscribe, a software client can be downloaded to the device and/or system for managing local sensor access, control and sensor data upload. At 704, program instructions can be received from a programmer or consumer of the data for executing command parameters as a task object. At 706, the task object is transmitted to the subscriber clients for execution. At 708, the task is executed on the client to expose sensor data based on tolerance level data. At 710, the task is executed on the client device to expose sensor data based on involvement level data. In other words, the sensor data is exposed if it is possible to yield the results within the tolerance level specified by the level at of the task. At 712, the sensor data is received and stored at a central data repository for access, analysis and processing.

Figure 8:
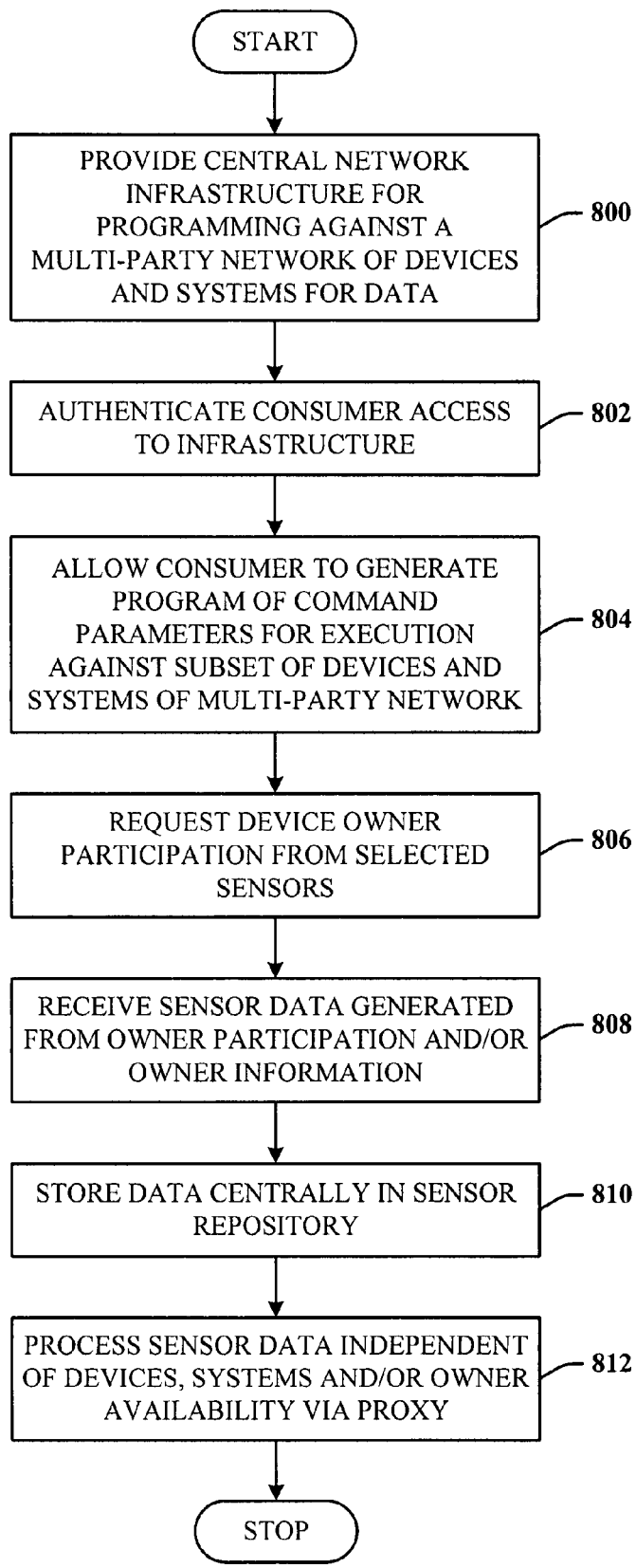
FIG. 8 illustrates a method of distributing and executing code to clients based on willingness of the client owner to allow exploitation of device resources.

FIG. 8 illustrates a method of distributing and executing code to clients based on willingness of the client owner to allow exploitation of device resources. At 800, a central network infrastructure is provided for programming against a multi-party network of devices and/or systems for data. At 802, consumer access to the infrastructure is authenticated. At 804, the consumer is allowed to generate one or more programs of command parameters for execution against a subset of devices and/or systems of the multi-party network.

At 806, the device owner is requested to participate if selected based on command parameters. Participation can include capturing images of current conditions or events that are transmitted back to the infrastructure, inputting text that describes an ongoing event, inputting text that describes an event that recently occurred, inputting audio data that captures audio information related to an event, transmitting geolocation data associated with the location of the device owner, and generally, any data of interest that can be obtained by the device owner and/or the owner device, as requested. At 808, the sensor and/or owner information is received. At 810, the received data is stored centrally in sensor data repository. At 812, the sensor data and/or owner information is processed independently of devices, systems, and/or owner availability via a sensor proxy.

Figure 9:
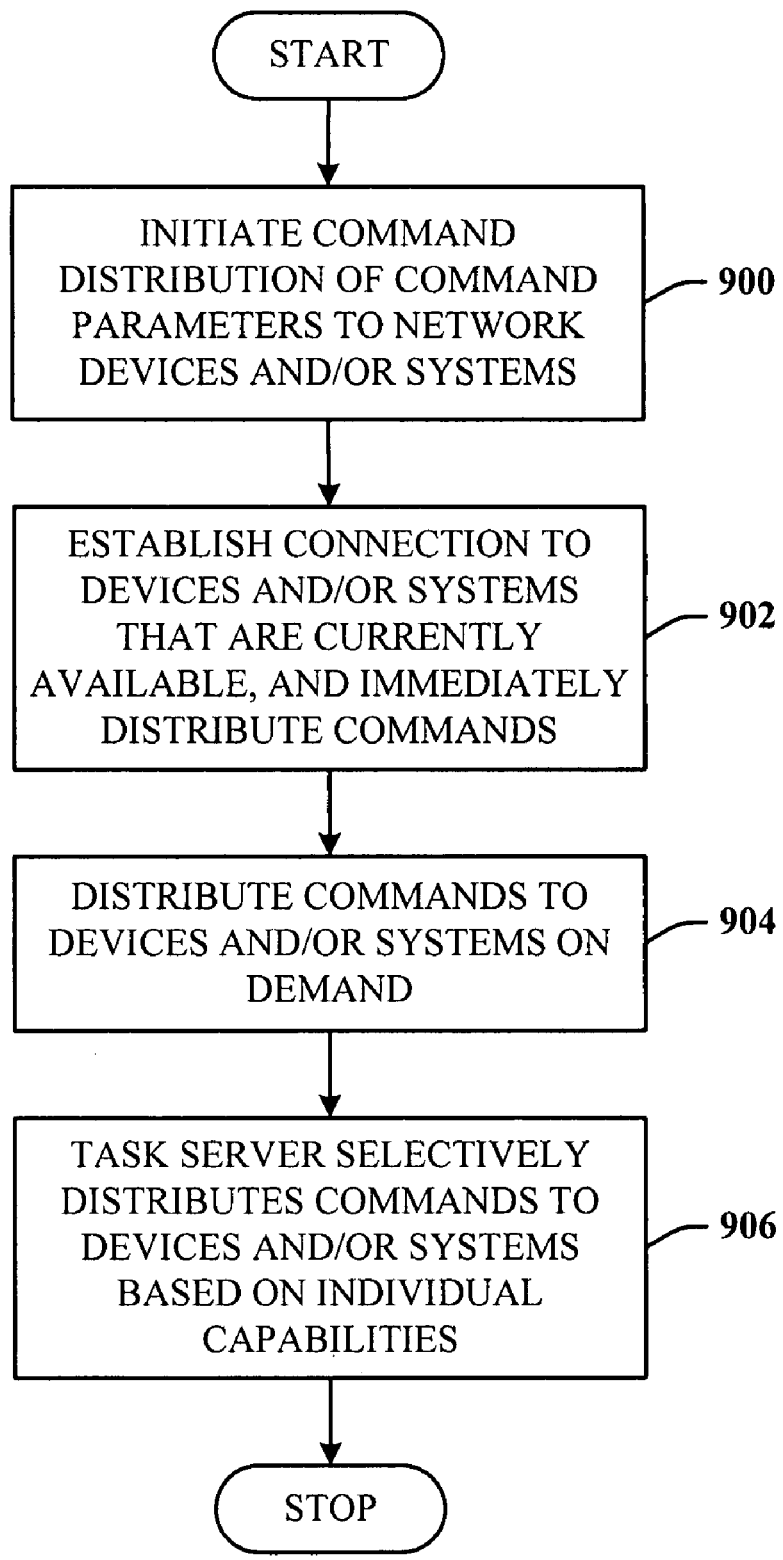
FIG. 9 illustrates a method of distributing commands to devices and/or systems for sensor access.

FIG. 9 illustrates a method of distributing commands to devices and/or systems for sensor access. At 900, command distribution of command parameters is initiated to network devices and/or systems. At 902, a connection is established to devices and/or systems that are currently available, and immediately distribute the commands. At 904, the commands are distributed to the devices and/or systems on demand therefrom. At 906, a task server distributes the commands to the devices and/or systems based on individual capabilities.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
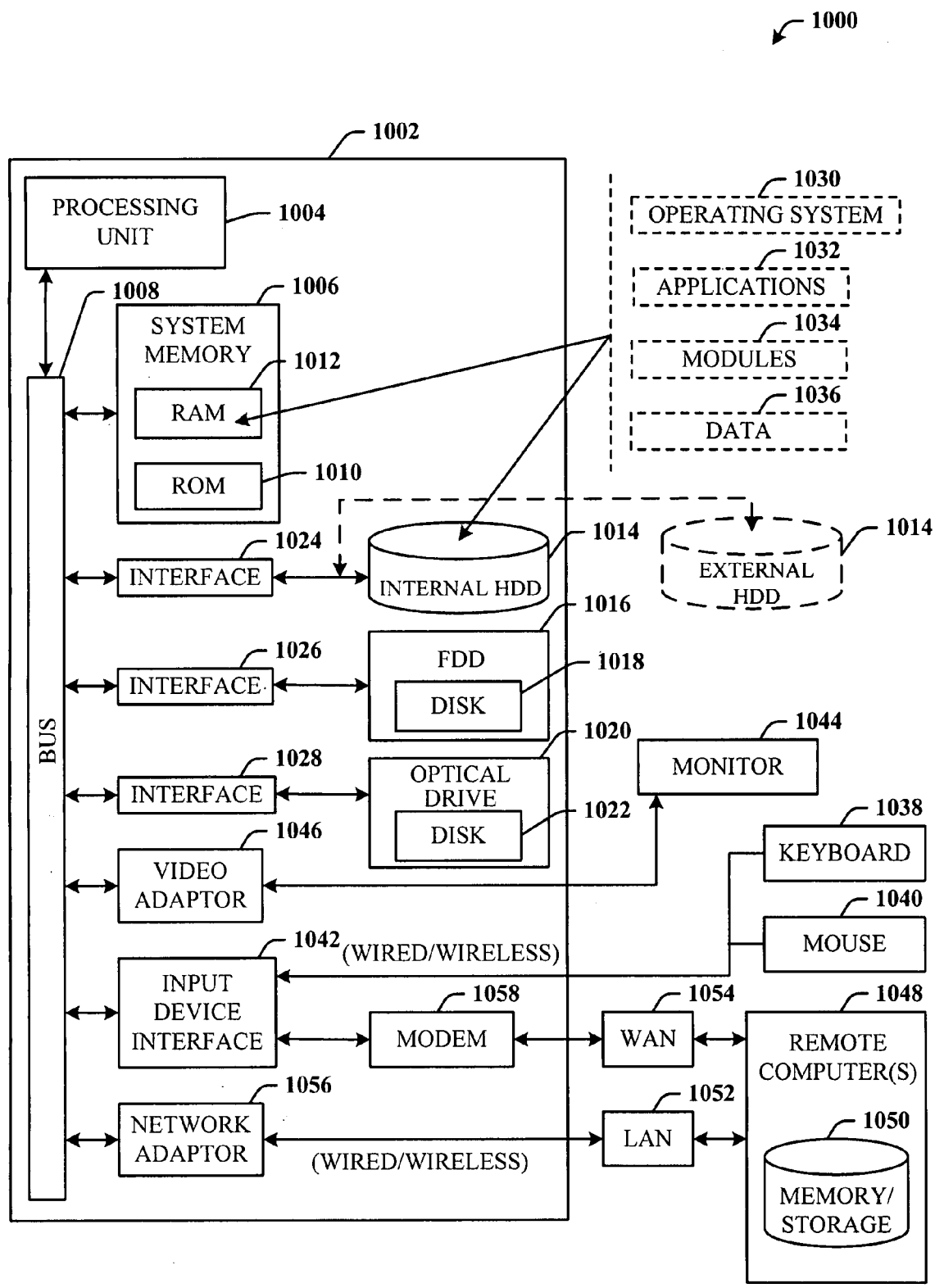
FIG. 10 illustrates a block diagram of a computing system operable to execute distributed programming and sensor data exposure in accordance with the disclosed architecture.

Referring now to FIG. 10, there is illustrated a block diagram of a computing system 1000 operable to execute distributed programming and sensor data exposure in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034 and program data 1036 can include the sensing component 102, task component 106, programming component 108, sensor proxy 212, data repository 208, tasking server 210, applications 204, GUI 216, device client 304, applications 310, command interface 312, sensor selection component 402, sensor and data management component 404, task scheduler 410, task execution component 412, web interface 414, and other parameters and environments described herein.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 11:
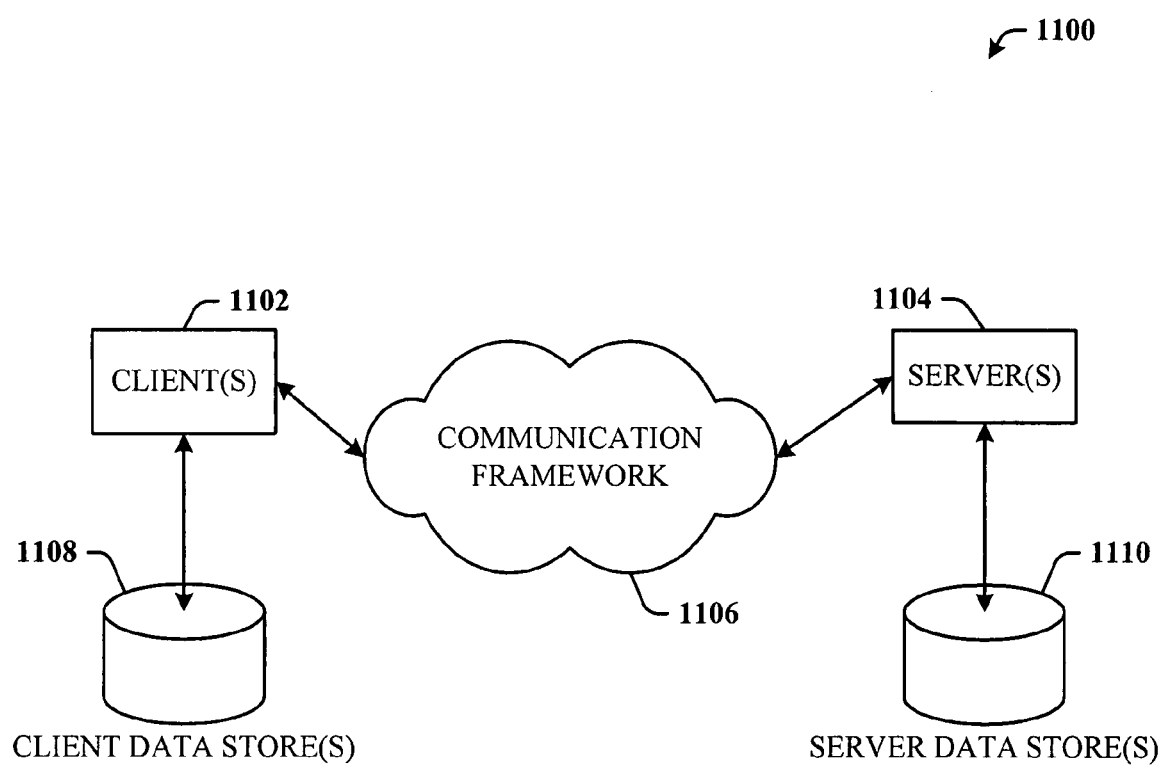
FIG. 11 illustrates a schematic block diagram of an exemplary computing environment for distributed programming and sensor data exposure based on device owner willingness.

Referring now to FIG. 11, there is illustrated a schematic block diagram of an exemplary computing environment 1100 for distributed programming and sensor data exposure based on device owner willingness. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The clients 1102 can include the device clients 304, cell phones, in-situ systems, and so on. The servers 1104 can include the tasking server 210, network infrastructure server 206, sensor proxy 212, and other serviced-based entities, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a network-based sensing component for accessing sensors of a multi-party network based on willingness of sensor owners to allow sensor data of the sensors to be accessed and shared at specific points in time, the multi-party network comprising a network that uses at least sensing and computational resources of multiple mobile devices owned by different sensor owners, the willingness of the sensor owner to share the data and the resources further comprises capacity of the sensors to provide the data and availability of device resources, the willingness and the capacity based on involvement level data as a set of numbers that quantify a degree of participation of at least one of the sensor owner or sensors of the owner to provide sensor data and resources;
   a task component for selecting the sensors of the multi-party network via the sensing component to access in accordance with execution of a task;
   a programming component for generating the task, the task including command parameters for execution by the task component against the sensors; and
   a processor that executes computer-executable instructions associated with at least one of the sensing component, task component, or programming component.

2. The system of claim 1, wherein the mobile devices of the multi-party network include at least one of cell phones having one or more phone sensors or in-situ sensor systems having one or more system sensors.

3. The system of claim 1, wherein the programming component is part of a centralized programming environment via which a consumer can access and develop a program for execution of the command parameters against the sensors.

4. The system of claim 1, wherein each of the sensors is associated with a client via which the command parameters are executed to obtain sensor data, and via which the sensor owner can control access to the sensor data from the task component.

5. The system of claim 1, wherein the sensing component includes a sensor proxy via which sensor data is made available when the sensors are inaccessible.

6. The system of claim 1, wherein the task includes a parameter related to a tolerance level for controlling execution of the task based on hardware and software capabilities of a device or system on which the sensor is associated.

7. The system of claim 1, wherein the programming component includes a consumer that employs a declarative command interface for issuing commands to a device or systems in which the sensors reside.

8. The system of claim 1, further comprising a centralized network infrastructure via which the programming component downloads an application, the functionality of which is based on the willingness of the sensor owner to allow the sensors to be exploited.

9. The system of claim 1, wherein the willingness of a sensor owner is based on at least one of inherent software and hardware capabilities of a sensor device, connection limitations of related to interacting with the sensors, amount of human invention requested to interact with the sensors, or impact on normal processes required of the sensors independent of the willingness.

10. A computer-implemented method of obtaining data, comprising acts of:
    providing a multi-party network of sensors by using at least sensing and computational resources of multiple mobile devices owned by different sensor owners;
    interfacing to the multi-party network of sensors via a network infrastructure, and from which sensor data can be obtained;
    generating a task object for execution by a consumer program via the network infrastructure, the task object defines one or more command parameters for receiving sensor data from the sensors;
    selecting a subset of the sensors from which to receive the sensor data;
    executing the program via the network infrastructure to receive the sensor data from the subset of sensors, the data received based on at least one of a willingness of sensor owners to allow sensor data of the sensors to be accessed and shared at specific points in time or capacity of owners of the sensors to allow the sensor data to be obtained, the willingness of the sensor owner to share the data and the resources further comprises capacity of the sensors to provide the data and availability of device resources, the willingness and the capacity based on involvement level data as a set of numbers that quantify a degree of participation of at least one of the sensor owner or sensors of the owner to provide sensor data and resources; and
    utilizing a processor that executes instructions stored in memory to perform at least one of the acts of providing, interfacing, generating, selecting, or executing.

11. The method of claim 10, further comprising including tolerance data in the task object associated with a level of tolerance related to a sensor command that a programmer of the task desires to execute on the multi-party network.

12. The method of claim 10, further comprising processing a participation profile of a sensor owner that includes involvement data, the involvement data quantifies a degree of the willingness that the owner will participate and allow an owner sensor to be utilized for generating and receiving the sensor data.

13. The method of claim 12, wherein the involvement data is input by the owner via the cell phone.

14. The method of claim 10, further comprising selecting the sensors of the multi-party network that meet involvement criteria related to at least one of what, where, when, tolerance level, or involvement level.

15. The method of claim 10, further comprising controlling access to the sensors via a declarative programming interface that is accessible only by an authenticated consumer.

16. The method of claim 10, further comprising pushing the one or more command parameters into a device of the sensors for execution.

17. The method of claim 10, further comprising distributing the one or more command parameters to the sensors based on an asynchronous request by a sensor device to receive the task object.

18. The method of claim 10, further comprising interfacing to in-situ sensor systems and executing program task objects against the in-situ sensor systems for processing in combination with the sensor data.

19. A computer-implemented system, comprising:
   computer-implemented means for providing a multi-party network of sensors by using at least sensing and computational resources of multiple cell phones owned by different owners;
   computer-implemented means for interfacing to the multi-party network of cell phones via a network infrastructure, and from which phone sensor data can be obtained;
   computer-implemented means for generating a task object for execution by a consumer program via the network infrastructure, the task object defines one or more command parameters for receiving sensor data from the cell phones;
   computer-implemented means for selecting a subset of the cell phones from which to receive the sensor data; computer-implemented means for executing the program via the network infrastructure to receive the sensor data from the subset of cell phones, the data received based on a willingness of an owner of the cell phone to allow the sensor data to be obtained, the willingness of the sensor owner to share the data and the resources further comprises capacity of the sensors to provide the data and availability of device resources, the willingness and the capacity based on involvement level data as a set of numbers that quantify a degree of participation of at least one of the sensor owner or sensors of the owner to provide sensor data and resources; and
   processor means that executes computer-executable instructions associated with at least one of the means for providing, interfacing, generating, selecting, or executing.

* * * * *